(12) United States Patent
Mathis (10) Patent No.: US 11,062,349 B2
(45) Date of Patent: Jul. 13, 2021

(54) DYNAMIC MARKETING ASSET GENERATION BASED ON USER ATTRIBUTES AND ASSET FEATURES

(71) Applicant: ADOBE INC., San Jose, CA (US)

(72) Inventor: Craig M. Mathis, American Fork, UT (US)

(73) Assignee: ADOBE INC., San Jose, CA (US)

(*) Notice: Subject to any disclaimer, the term of this patent is extended or adjusted under 35 U.S.C. 154(b) by 1017 days.

(21) Appl. No.: 14/842,333

(22) Filed: Sep. 1, 2015

(65) Prior Publication Data

US 2017/0061472 A1    Mar. 2, 2017

(51) Int. Cl.
*G06Q 30/02* (2012.01)
*G06N 20/00* (2019.01)

(52) U.S. Cl.
CPC ......... *G06Q 30/0246* (2013.01); *G06N 20/00* (2019.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 8,583,488 B2* | 11/2013 | Janos | ................. | G06Q 30/0225 705/14.72 |
| 2010/0145794 A1* | 6/2010 | Barger | ............... | G06Q 30/0246 705/14.45 |
| 2011/0078003 A1* | 3/2011 | Steelberg | ............... | G06Q 30/02 705/14.4 |
| 2011/0119125 A1* | 5/2011 | Javangula | ............... | G06Q 30/02 705/14.43 |
| 2011/0320262 A1* | 12/2011 | Symons | ............ | G06Q 30/0254 705/14.42 |
| 2014/0006930 A1* | 1/2014 | Hollis | ................... | G06F 3/0482 715/234 |

* cited by examiner

*Primary Examiner* — John Van Bramer
(74) *Attorney, Agent, or Firm* — Shook, Hardy & Bacon LLP (57) ABSTRACT

Marketing assets are automatically generated from asset components having asset features relevant to target users. Asset delivery event data regarding the delivery of marketing assets is initially collected to identify asset features of delivered marketing assets and user attributes of users receiving the marketing assets. The asset delivery event data is processed using machine-learning techniques to generate a model capable of selecting asset features given a set of user attributes. When a request for a new marketing asset is received for a particular user, user attributes of that user are identified and provided to the model to select a set of asset features. The asset features are used to select asset components, which are combined to form the new marketing asset.

18 Claims, 5 Drawing Sheets

FIG. 1.

| USER ATTRIBUTE 1 | USER ATTRIBUTE 2 | ... | USER ATTRIBUTE X | ASSET FEATURE 1 | ASSET FEATURE 2 | ... | ASSET FEATURE Y |
|---|---|---|---|---|---|---|---|
| MALE | 25 |  | GOLD | BLUE | MALE |  | WINTER |
| FEMALE | 34 |  | SILVER | RED | MALE |  | SUMMER |
| MALE | 56 |  | NA | GREEN | FEMALE |  | SPRING |
| ... | ... |  | ... | ... | ... |  | ... |
| ... | ... |  | ... | ... | ... |  | ... |

DYNAMIC MARKETING ASSET GENERATION BASED ON USER ATTRIBUTES AND ASSET FEATURES

BACKGROUND

Online marketing has become a significant aspect of computing environments, as it presents a powerful way for marketers to reach audiences for their products and services. For instance, marketing messages may be delivered in a variety of different computing environments, such as on web pages, within email systems, and on social network sites, to name a few. Additionally, online marketing allows marketers to more effectively target desired audiences as compared with traditional media, such as newspapers, magazines, and radio. For instance, online marketing technologies allow particular marketing messages to be selectively delivered to particular users.

Typically, marketing assets delivered to users via online marketing are created by a marketer's creative team. This provides only a finite set of available marketing assets to market and entice customers into performing some action. Using analytics data, an analyst is able to identify new segments of users or segments that are not performing well, but it's currently a manual process to generate new marketing assets for those segments. This process can be timely, as it requires first finding the segments and then members of the creative team to manually generate the new marketing assets.

Some approaches have been developed that allow marketing assets to be automatically generated using a template layout. While this alleviates problems associated with having a creative team manually generate all marketing assets, the template approach is too rigid. The layout is fixed and only certain items can be placed into particular layout locations. This limits the extent to which a marketing asset can be tailored to a target user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to automatically generating marketing assets from asset components that include portions of marketing content having asset features relevant to target users. In accordance with embodiments of the present invention, marketing assets are initially delivered to users to collect asset delivery event data that identifies asset features of delivered marketing assets and user attributes of the users receiving the delivered marketing assets. In some instances, user interaction data reflecting a level of user interaction with each delivered marketing asset is also collected. The asset delivery event data is analyzed using machine-learning techniques to generate an asset feature selection model capable of selecting asset features given a set of user attributes. When a request is received for delivery of a new marketing asset to a user, user attributes of the user are identified and provided to the asset feature selection model to select a set of asset features. The set of asset features are, in turn, used to select asset components tagged with those asset features. The asset components are then combined to form a new marketing asset, which is delivered to the user. Using this approach, the marketing asset is generated to include asset features that are likely to result in the user performing some desired user interaction with the marketing asset. Additionally, the marketing asset is not limited by any template. Instead, any number and type of asset components can be selected and arranged given a selected set of asset features.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

A "marketer" refers to an entity that markets one or more products or services. For instance, a marketer may be a company that manufactures, distributes, and/or sells a product or offers a service, or an entity that markets such a company's product or service on behalf of the company.

The term "product" is used herein to refer not only to goods or merchandise but also includes services provided by a marketer.

A "marketing asset" refers to a piece of marketing content configured for electronic delivery over a communication network for presentation to a person within any of a variety of different computing environments, such as, for instance, within web pages, web search results, email systems, applications, games, and social networking sites.

As used herein, a "user" refers to a person targeted with a marketing asset.

"Asset components" refer to portions of marketing content that are configured to be combined together to form a marketing asset. A variety of different types of asset components are possible. By way of example only and not limitation, an "image component" includes a still image, a "text component" includes a textual message, a "video component" includes a video (or link to a streaming video), and a "landing page component" includes a link to a particular landing page. Any of a variety of other types of asset components may be used in embodiments of the present invention.

An "asset feature" refers to any aspect used to characterize a marketing asset or asset component. For instance, asset features identify and characterize objects within an image, a particular textual message, objects/actions/themes of a video, and/or a particular landing page.

"Asset component relational information" refers to information provided for asset components that is used in selecting and combining asset components to form marketing assets. In some instances, asset component relational information indicates whether asset components are combinable in a marketing asset. In other instances, asset component relational information specifies how asset components are combined when generating a marketing asset and may include sizing, orientation, and/or location information. For instance, asset component relational information may specify whether one image component is layered above or below other images components when generating a composite image for a marketing asset.

A "user attribute" refers to any aspect used to characterize a user to whom a marketing asset is targeted. For example, user attributes include, among other things, user demographics (e.g., gender, age, marital status, residence location, etc.), interests, hobbies, and purchasing behaviors.

An "asset delivery event" refers to the delivery of a particular marketing asset to a particular user.

"Asset delivery event data" for a given asset delivery event includes asset features of the marketing asset delivered and user attributes of the user to whom the marketing asset was delivered. In some embodiment, the asset delivery event data for a given asset delivery event includes "user interaction data" that identifies the type(s) of user interaction with the delivered marketing asset. By way of example only and not limitation, user interaction data includes: an impression (presentation of the marketing asset to the user), a user click to access a landing page with additional content regarding the marketed product, a user click to view a video, and a conversion corresponding with the user performing a desired action, such as, for instance, the user purchasing a product or signing up to receive emails from the marketer.

The advent of computing and networking technologies in the modern era has enabled marketers to target audiences with online marketing messages that were not previously available with traditional media, such as newspapers, radio, and television. However, generating marketing assets for online marketing has traditionally been a very labor intensive process that involves tasking a marketer's creative teams with manually creating the marketing assets. This provides only a limited set of marketing assets available for marketing campaigns. If available analytics demonstrate that the available marketing assets don't properly target a given segment of users or a new segment of users is identified, the creative team must manually generate new marketing assets.

One solution that has been presented to alleviate the burden of manually generating marketing assets includes automatically generating marketing assets using a template. The template provides a number of areas for placing marketing content and defines what type of marketing content can be inserted into each area. While this allows for the automatic generation of marketing assets, the approach is too rigid as it restricts the marketing content that can be included, as well as the location of the marketing content within the marketing assets.

Accordingly, embodiments of the present disclosure address these new technological problems introduced by the advent of online marketing by providing solutions for automatically generating marketing assets in a manner that configures the marketing content such that is optimally targeted to the users receiving the marketing assets. In accordance with embodiments of the present invention, asset delivery event data is collected that includes information regarding the delivery of marketing assets to different users. The asset delivery event data identifies asset features of the delivered marketing assets and user attributes of the users receiving the marketing assets. Machine-learning techniques are used to analyze the asset delivery event data and generate an asset feature selection model that is capable of returning relevant asset features given a set of user attributes.

After generating the asset feature selection model, when a request is received to deliver a marketing asset to a given user, user attributes of that user are identified and processed with the model to select a set of asset features. The selected asset features are used to select a number of asset components from a repository of asset components. The asset components are then combined together to form a marketing asset having the asset features selected based on the given user attributes, and the marketing asset is delivered to the user. As will be discussed in further detail below, the asset components may be located relative to one another within the marketing asset based on asset component relational information and/or selected asset features providing information to position asset components relative to one another.

As can be understood based on this disclosure, marketing assets are generated in some embodiments of the present invention without the use of any template. Instead, any number of asset features can be selected for a given set of user attributes. Those selected asset features may result in the selection of any number of asset components, as well as varying combinations of asset component types. The location of the asset components within marketing assets are also not fixed. Accordingly, a wide variety of marketing assets are automatically generated with asset features that optimally target the particular users receiving the marketing assets.

By way of illustration, consider examples of marketing a mobile device to two different users. A first user has the following user attributes: gender: male; age: 20-25; marital status: single; interest: baseball. Based on these user attributes, the following asset features are selected: baseball stadium; male aged 20-25; baseball cap; mobile device; a first textual message; text formatting including a particular text font, size, and color; and a first landing page. Given these asset features, the following asset components are selected: an image component having an image of a baseball stadium; an image component having an image of a male aged 20-25; an image component having an image of a baseball cap; an image component having an image of a mobile device; a text component have the first textual message; and a landing page component that includes a link to the first landing page. The marketing asset for this first user is generated by layering the image components to provide a composite image of the male at the baseball stadium wearing the baseball cap and holding the mobile device in a hand. Additionally, the first textual message is formatted using the text formatting specified by the asset features and displayed above the composite image, and clicking anywhere on the marketing asset results in navigation to the first landing page.

The second user has the following user attributes: gender: male; age: 55-60. Given these user attributes, the following asset features are selected: a second textual message; a second landing page; and a video with a particular feature. Based on these asset features, the following asset components are selected: a text component having the second textual message; a landing page component that includes a link to the second landing page; and a video component with a video tagged with the particular feature. The marketing asset for this second user is generated by placing the second textual message to the left of a frame for playing the video. Additionally, clicking only on the area surrounding the second textual message results in navigation to the second landing page.

Figure 1:
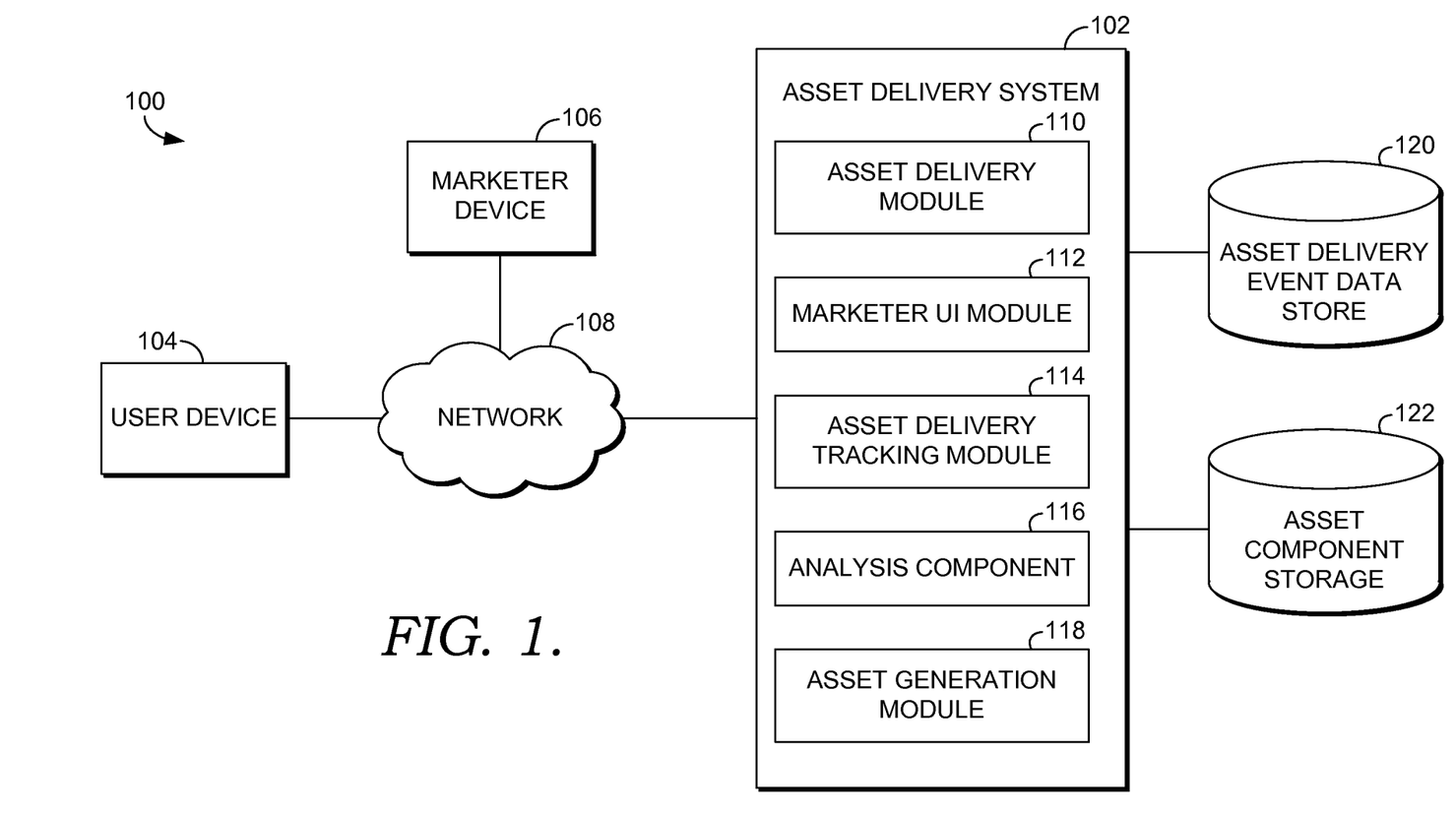
FIG. 1 is a block diagram of an exemplary system architecture in which embodiments of the invention may be employed.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes an asset delivery system 102, any number of user devices, such as the user device 104, and any number of marketer devices, such as the marketer device 106. It should be understood that the system 100 shown in FIG. 1 is an example of one suitable computing system architecture. Each of the components shown in FIG. 1 may be implemented via any type of computing device, such as computing device 500 described with reference to FIG. 5, for example. The components may communicate with each other via a network 108, which may include, without limitation, one or more local area networks (LANs) and/or wide area networks (WANs). Such networking environments are commonplace in offices, enterprise-wide computer networks, intranets, and the Internet. It should be understood that any number of asset delivery systems, user devices, and marketer devices may be employed within the system 100 within the scope of the present invention. Each may comprise a single device or multiple devices cooperating in a distributed environment. For instance, the asset delivery system 102 may be provided via multiple devices arranged in a distributed environment that collectively provide the functionality described herein. Additionally, other components not shown may also be included within the network environment.

The asset delivery system 102 includes an asset delivery module 110 that is generally configured to deliver marketing assets to user devices, such as the user device 104. Marketing assets may be delivered in any of a number of different computing environments, such as, for instance, within web pages, web search results, email systems, applications, games, and social networking sites. In some configurations, the asset delivery module 110 delivers marketing assets over the network 108 directly to user devices, such as the user device 104. In other configurations, the asset delivery module 110 delivers marketing assets to another component, such as a separate advertising system (not shown), which in turn, delivers the marketing assets to user devices, such as the user device 104.

The asset delivery system 102 also includes a marketer UI module 112, which allows marketers to manage marketing campaigns using a computing device, such as the marketer device 106, to access and communicate with the asset delivery system 102 via the marketer UI module 112. In accordance with embodiments of the present invention, a marketer provides asset components usable by the asset delivery system 102 to automatically generate marketing assets. The asset components may include any of a variety of different types of components, such as image components, text components, video components, and landing page components. Additionally, asset features are identified for the asset components. In some configurations, the marketer specifies the asset feature(s) for each asset component. In some configurations, asset features are algorithmically determined by the asset delivery system 102. For instance, image recognition techniques may be employed to analyze asset components to identify certain objects as asset features.

Asset component relational information is also provided that specifies how some asset components may be combined with other asset components to form marketing assets. In some instances, the asset component relational information specifies how asset components are located, sized, and/or oriented with respect to other asset components. For example, suppose a composite image is generated for a marketing asset from three image components, including a background image, an image of a person, and an image of a mobile device. The asset component relational information in the present example specifies that the image of the mobile device is layered on top of the image of the person, which is layered on top of the image of the background. The asset component relational information also specifies a size, orientation, and location for the image of the mobile device relative to the image of the person, such that the composite image includes the person holding the mobile device.

Asset components, corresponding asset features, and asset component relational information are stored in an asset component storage 122, in order to provide a repository of asset components and information useful for generating marketing assets.

In some embodiments, a marketer also provides pre-configured marketing assets. This provides marketing assets that are ready to be delivered to users. These pre-configured marketing assets may be delivered to users, for instance, before sufficient information has been collected for automatically generating marketing assets from asset components. However, it should be understood that use of the pre-configured marketing assets is not so limited, and pre-configured marketing assets may be delivered to users at any time. Assets features are also provided for the pre-configured marketing assets, either manually by the marketer or algorithmically determined by analyzing the marketing assets, for instance, by using image recognition techniques.

When marketing assets are delivered to users, information regarding the asset delivery events is tracked by the asset delivery tracking module 114. For each asset delivery event, the asset delivery tracking module 114 tracks and records asset features of the marketing asset delivered. In the event of a pre-configured marketing asset being delivered, the asset features tagged to that pre-configured marketing asset are identified and stored for the asset delivery event. In the event of a marketing asset being delivered that was generated from asset components, the asset features tagged to the asset components used to generate the marketing asset are identified and stored for the asset delivery event.

The asset delivery tracking module 114 also records, for each asset delivery event, user attributes of the user to whom the marketing asset was delivered. The user attributes of the user are identified based on any of a number of different sources, such as, for instance, IP address, user login, feeds from CRM system, social data, and data from user data platforms (e.g., the BLUEKAI data platform). The user attributes may be associated with an anonymous profile that can't be used to identify the actual user to protect the privacy of the user.

In some embodiments, the asset delivery tracking module 114 also records, for each asset delivery event, user interaction data identifying a type of user interaction with the marketing asset. This may be, for instance: an impression in which the marketing asset is delivered to the user but the user doesn't otherwise interact with the marketing asset; a click on the marketing asset to navigate to a landing page; a click on the marketing asset to view an associated video; or a conversion in which the user performs some desired action, such as purchasing a product or signing up to receive emails from the marketer. It should be understood that these are only examples of user interactions and other types of user interaction may be tracked.

The asset delivery event data is stored in an asset delivery event data store 120. In some configurations, asset deliver event data is tracked and stored for all asset delivery events. In other configurations, asset delivery event data is tracked and stored only for asset delivery events that have a desired user interaction or any one of several desired user interactions. As an example, asset delivery event data could be recorded only for asset delivery events that resulted in a conversion.

Figure 2:
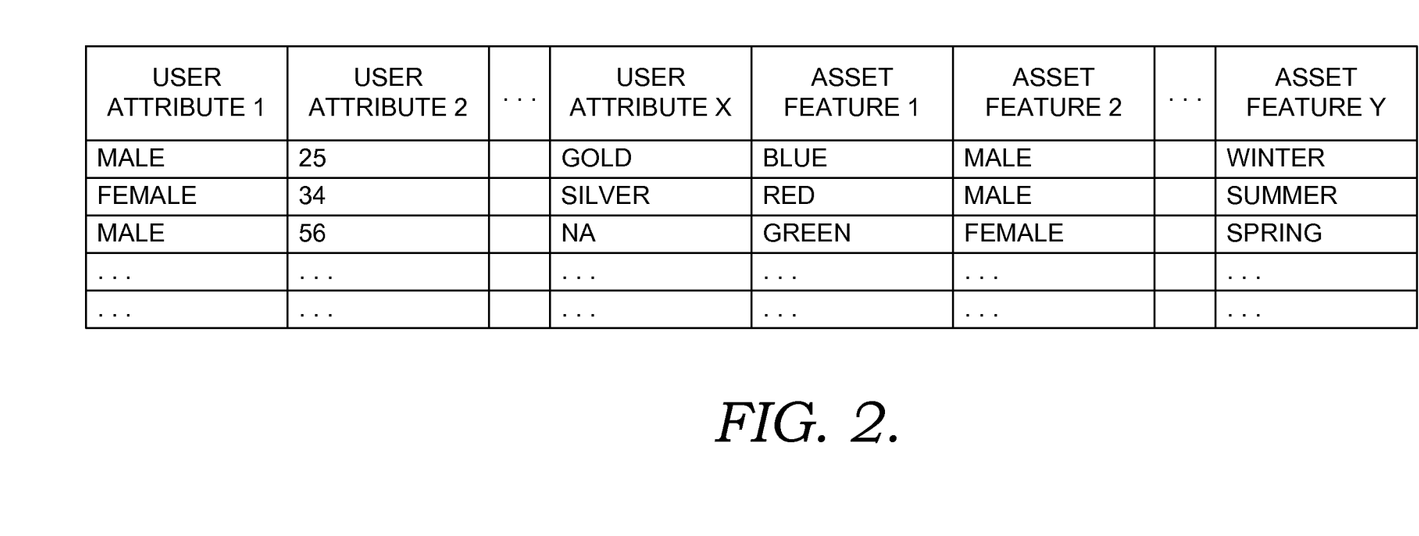
FIG. 2 is a diagram illustrating a table dataset for storing asset delivery event data in accordance with an embodiment of the present invention.

The asset delivery event data may be stored in any of a variety of different storage formats. By way of example only, in some configurations, the asset delivery event data is stored in a table dataset, such as the table dataset 200 in FIG. 2. As shown in the table dataset 200, each row corresponds with an asset delivery event. For a given asset delivery event, a row includes asset features of the marketing asset delivered and user attributes of the user to whom the marketing asset was delivered. Although not shown in FIG. 2, in some embodiments, a row also includes user interaction data for the corresponding asset delivery event. Assuming X user attributes and Y asset features, for M asset delivery events, an (X+Y)×M data set is provided. This dataset continues to grow vertically as new asset delivery events occur and continues to grow horizontally as new user attributes and asset features become available.

An analysis component 116 analyzes the asset delivery event data using any of a number of known machine-learning techniques to generate a model for selecting asset features given a set of user attributes. For example, in one configuration, known machine-learning techniques are used to auto segment (cluster) users based on user attributes and identify the asset features relevant to each segment. Asset features and user attributes can be weighted to allow the modeling algorithms to give more focus to certain variables.

The model provided by the analysis component 116 is used by the asset generation module 118 when generating marketing assets for asset delivery events. In particular, when a request for a marketing asset is received by the asset delivery system 102, user attributes are determined for the user to whom the marketing asset is being delivered. In some embodiments, the user attributes are provided in combination with the request. The user attributes are processed using the model provided by the analysis component 116 to select a set of asset features. These asset features are ones that will likely result in a desired user interaction with the marketing asset based on tracked asset delivery event data.

The asset generation component 118 uses the selected asset features to select asset components that collectively provide the selected asset features. The asset components are selected from the asset component storage 122 based on asset features tagged to the asset components, for instance, by keyword matching that identifies asset components tagged with asset features that keyword match the selected asset features. In some configurations, this includes performing queries over the stored asset components using the identified asset features as query keywords. Each query corresponds with one of the identified asset features or a combination of two or more of the identified asset features. Additionally, each query returns at least one asset component that is tagged with an asset feature or group of asset features matching the query asset feature(s). The asset generation component 118 combines the selected asset components to generate a marketing asset, which is then delivered to the user device via the asset delivery module 110.

By way of example to illustrate, suppose the following user attributes are provided: gender: male; age: 20-25; marital status: single; interest: baseball. Based on these user attributes, the asset generation module 118 employs the model provided by the analysis component 116 to select the following asset features: baseball stadium; male aged 20-25; baseball cap; mobile device; a particular textual message; text formatting including a particular text font, size, and color; and a particular landing page. Given these asset features, the following asset components are selected: an image component having an image of a baseball stadium; an image component having an image of a male aged 20-25; an image component having an image of a baseball cap; an image component having an image of a mobile device; a text component have the particular textual message; and a landing page component that includes a link to the particular landing page. For instance, queries may be performed over an asset component database using the following query keywords: "baseball stadium," "male, aged 20-25," "baseball cap," "mobile device," "text message 1," and "landing page 1." Note that the "male, aged 20-25" could be considered as two combined asset features. Each query returns an asset component tagged with an asset feature that keyword matches a corresponding query keyword. For instance, the image component having an image of a baseball stadium is returned in response to a query using the "baseball stadium" query keyword and based on that image component being tagged with "baseball stadium" as an asset feature. Some queries also specify a type of asset component, which may limit the query to a particular asset component type, such as an image component. In some configurations, the asset component type is stored as an asset feature and the query includes that as a query keyword. Continuing the example of identifying the asset component having the image of the baseball stadium, the query could be formulated using "baseball stadium" and "image component" as query keywords. Boolean operators, such as AND, OR, and NOT can also be employed when formulating the queries. In the present example, "baseball stadium" and "image component" would be joined using an AND operator such that only an image component that is tagged with both of those asset features would be returned. Similarly, the "male, aged 20-25" query may be formed by the query keywords "male"

and "aged 20-25" being joined using an AND operator. Alternatively, the terms may form a single query keyword. As can be understood, a query keyword is not limited to a single word but may include any number of words or phrases.

The selected asset components are then combined to form a marketing asset. This includes forming a composite image from the image components, which may include using asset component relational information to properly combine the images. In the present example, asset component relational information specifies that the image of the male is layered on top of the image of the baseball stadium. Additionally, asset component relational information specifies how the baseball cap and mobile device are sized, oriented, and located relative to the male to place the baseball cap on the male's head and the mobile device in the male's hand. The textual message is included in the font, size, and color identified by the text formatting in the asset features. Additionally, a link to the particular landing page is added.

In some embodiments, the asset features returned by the model include positional information that specifies how particular asset features are located relative to other asset features. For instance, an asset feature may specify where a textual message feature is located relative to an image feature, where one image feature is located relative to another image feature, and/or where a link to a landing page is located. By way of illustration, continuing the example above, an asset feature could specify that the textual message is displayed above, below, to the side of, or on top of the composite image of a male at a baseball stadium wearing a baseball cap and holding a mobile device. As another example, an asset feature may specify whether the mobile device is in the male's left hand or right hand or whether the baseball cap is on straight, sideways, or backwards. As still another example, an asset feature may specify a particular location at which a user click actives the link to the landing page.

In some embodiments, the asset generation component 118 is also configured to randomly generate marketing assets from asset components from some asset delivery events. That is, for a given marketing asset deliver event, the asset generation component 118 does not consider user attributes when selecting asset components, but instead, asset components are randomly selected and combined to form a marketing asset. In some instances, the asset generation component 118 randomly generates marketing assets before sufficient asset delivery event data has been collected. However, it should be understood the asset generation component 118 may provide randomly-generated marketing assets at any time. For instance, randomly-generated marketing assets may be periodically delivered to provide varied information for the asset delivery event data.

The following provides an example of the processing of asset delivery event data in accordance with one implementation. As each marketing asset is presented to a user, data is collected as in Table 1 below:

TABLE 1

| Visitor Gender | Visitor Browser | Visitor Pre Visits | Visitor Orders | Visitor Referrer | Asset Color | Asset Style | Asset Text | Asset Location | Converted (clicked) |
|---|---|---|---|---|---|---|---|---|---|
| Male | Safari | 2 | 1 | Google | Blue | Horizontal | True | Country | True |
| Female | Chrome | 0 | 0 | N/A | Red | Vertical | False | Lounge | False |
| N/A | IE | 1 | 2 | Google | Yellow | Horizontal | False | Beach | True |
| Male | Safari | 10 | 0 | Yahoo | Blue | Horizontal | True | City | False |
| N/A | Chrome | 3 | 0 | N/A | Blue | Vertical | True | City | True |
| Etc. | | | | | | | | | |

Each time a particular action occurs (e.g., the marketer may specify if this is a click, purchase, product view, etc.), the system continues to build out new datasets with the visitor attributes in binary form and each asset feature used as shown in Tables 2-5 below:

TABLE 2

Asset Color

| Gender M | Gender F | Brows C | Brows S | Brows I | Ref. G | Ref. Y | Orders | Visits | Feature |
|---|---|---|---|---|---|---|---|---|---|
| 1 | 0 | 0 | 1 | 1 | 1 | 0 | 1 | 2 | Blue |
| 0 | 1 | 1 | 0 | 0 | | | 0 | 0 | Yellow |
| 0 | 0 | 1 | 0 | 0 | 0 | 0 | 0 | 3 | Blue |

TABLE 3

Asset Style

| Gender M | Gender F | Brows C | Brows S | Brows I | Ref. G | Ref. Y | Orders | Visits | Feature |
|---|---|---|---|---|---|---|---|---|---|
| 1 | 0 | 0 | 1 | 1 | 1 | 0 | 1 | 2 | Horizontal |
| 0 | 1 | 1 | 0 | 0 | | | 0 | 0 | Horizontal |
| 0 | 0 | 1 | 0 | 0 | 0 | 0 | 0 | 3 | Vertical |

TABLE 4

Asset Text Shown

| Gender M | Gender F | Brows C | Brows S | Brows I | Ref. G | Ref. Y | Orders | Visits | Feature |
|---|---|---|---|---|---|---|---|---|---|
| 1 | 0 | 0 | 1 | 1 | 1 | 0 | 1 | 2 | True |
| 0 | 1 | 1 | 0 | 0 |  |  | 0 | 0 | False |
| 0 | 0 | 1 | 0 | 0 | 0 | 0 | 0 | 3 | True |

TABLE 5

Asset Location

| Gender M | Gender F | Brows C | Brows S | Brows I | Ref. G | Ref. Y | Orders | Visits | Feature |
|---|---|---|---|---|---|---|---|---|---|
| 1 | 0 | 0 | 1 | 1 | 1 | 0 | 1 | 2 | Country |
| 0 | 1 | 1 | 0 | 0 |  |  | 0 | 0 | Beach |
| 0 | 0 | 1 | 0 | 0 | 0 | 0 | 0 | 3 | City |

With these datasets in place, the system trains a probabilistic model/classifier for each of the asset features (using multinomial logistic regression, for example). Each asset feature model/function will take user attributes as the input and return the probability of each option for that feature.

For example, on picking the asset tone/color the function would take a set of visitor features and return something like: 20% white, 10% blue, 60% red, and 10% green. This means there is a 60% chance that the visitor will respond to red. The system decides what the threshold to use and picks the highest probability or a random value. The system will do this for each of the possible asset features and use this as the list of feature that should be used for the asset. The system and models will continue to improve as more asset delivery event data is collected.

Figure 3:
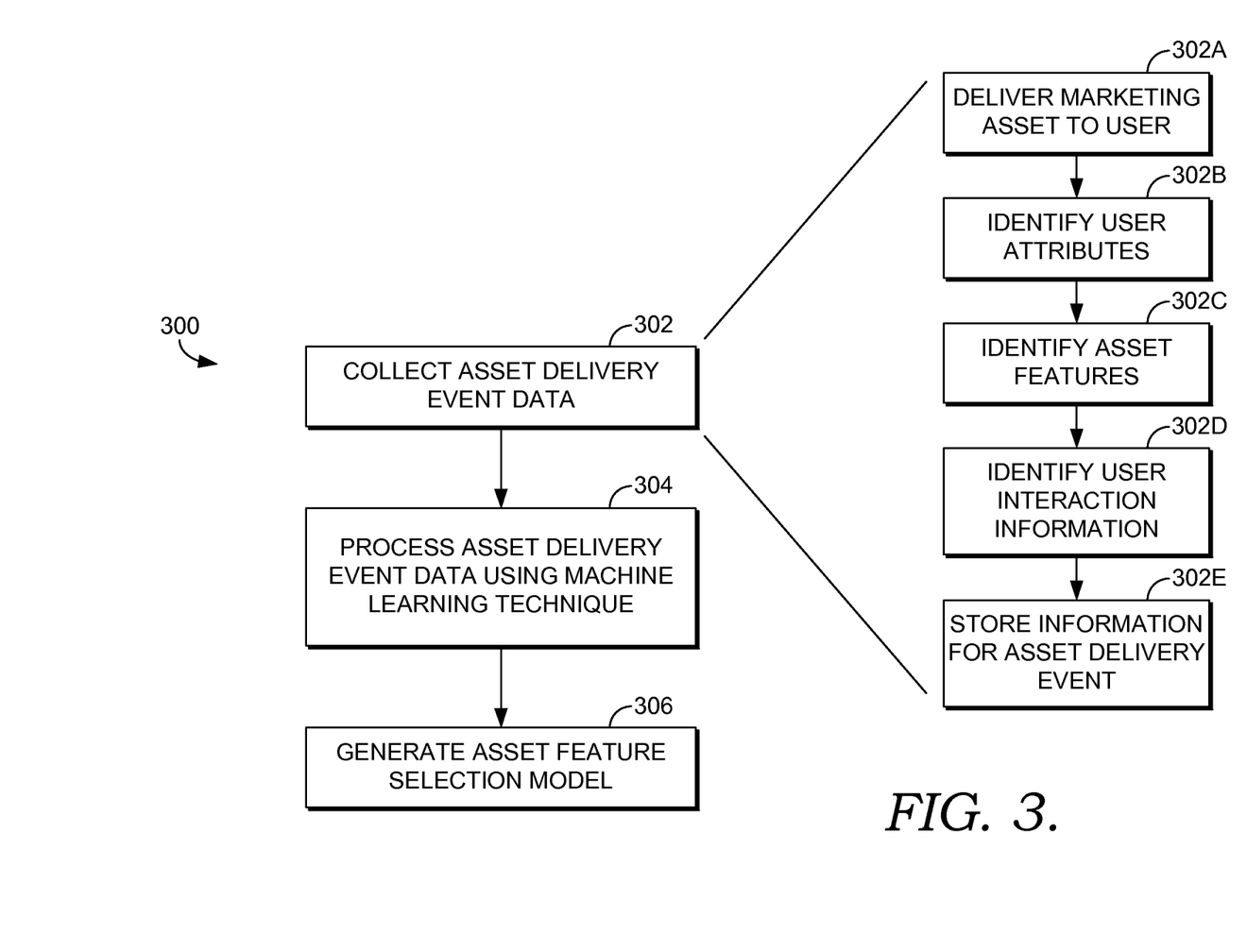
FIG. 3 is a flow diagram showing a method for generating an asset feature selection model based on tracked asset delivery event data in accordance with embodiments of the present invention.

With reference now to FIG. 3, a flow diagram is provided that illustrates a method 300 for generating an asset feature selection model based on tracked asset delivery event data. Each block of the method 300 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 300 may be performed using a computing device, such as the computing device 500 of FIG. 5.

As shown at block 302, asset delivery event data is collected for a number of asset delivery events sending different marketing assets to different users. This includes, for a given asset delivery event, sending a particular marketing asset to a particular user, as shown at block 302A. User attributes for the user receiving the marketing asset are identified, as shown at block 302B. As noted above, user attributes for a user are determined from any of a number of different sources. Additionally, asset features of the marketing asset delivered to the user are determined, as shown at block 302C. In the instance in which a pre-configured marketing asset is delivered, the asset features tagged to that pre-configured marketing asset are identified. In the instance in which a marketing asset generated from asset components is delivered, the asset features tagged to the asset component used to generate the marketing asset are identified. In some embodiments, such as the one shown in FIG. 3, user interaction information is also identified, as shown at block 302D. This includes information regarding any user interaction with the delivered marketing asset. The user attributes, asset features, and user interaction data for the asset delivery event are stored, as shown at block 302.

Asset delivery event data collected from a number of different asset delivery events is processed using any of a number of known machine-learning algorithms, as shown at block 304. In particular, user attributes and corresponding asset features (and user interaction information in some case) are provided as input to a machine-learning algorithm. An asset feature selection model is generated based on this analysis, as shown at block 306. For example, in one configuration, known machine-learning techniques are used to auto segment (cluster) users based on user attributes and identify the asset features relevant to each segment. Asset features and user attributes can be weighted to allow the modeling algorithms to give more focus to certain variables. Accordingly, this provides a model useable to select asset features for a given set of user attributes.

Figure 4:
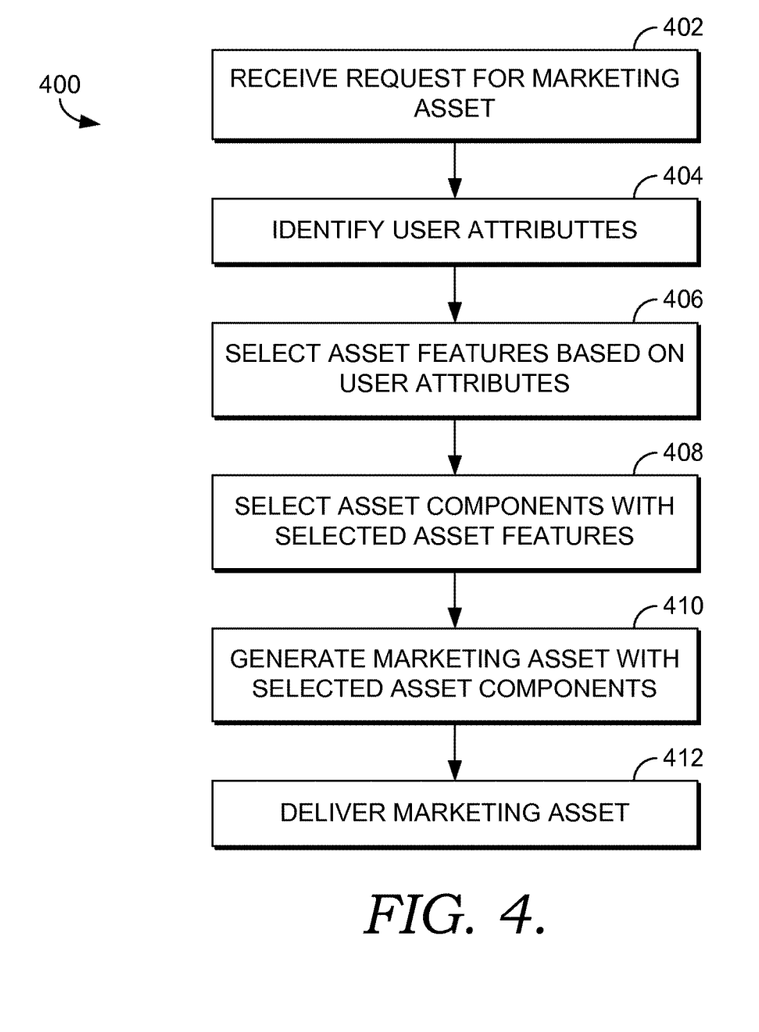
FIG. 4 is a flow diagram showing a method for automatically generating a marketing asset from asset components in accordance with embodiments of the present invention.

FIG. 4 provides a flow diagram showing a method 400 for automatically generating a marketing asset for delivery to a user. As shown at block 402, a request for a marketing asset is received. User attributes are determined for the user to whom the marketing asset is to be delivered, as shown at block 404. As noted previously, user attributes for a user are determined from any of a number of different sources.

The user attributes are provided as input to an asset feature selection model, such as the one generated in accordance with the method 300 of FIG. 3. Given the user attributes, a set of asset features are determined, as shown at block 406. Asset components are selected based on the set of asset features, as shown at block 408. Generally, the asset components are selected based on identifying asset component tagged with asset features matching the asset features selected at block 406. If there are a number of different asset components tagged with a particular matching asset feature, one of the asset components is randomly selected or selected based on other considerations, such as compatibility with other selected asset components.

A marketing asset is generated from the selected asset components, as shown at block 410, and the marketing asset is delivered to the user, as shown at block 412. The marketing asset may be generated without using any template. Instead, as discussed previously, the asset components may be positioned relative to one another when generating the marketing asset based on asset component relational information stored for the asset components and/or asset features selected at block 406 that provide positional information.

Figure 5:
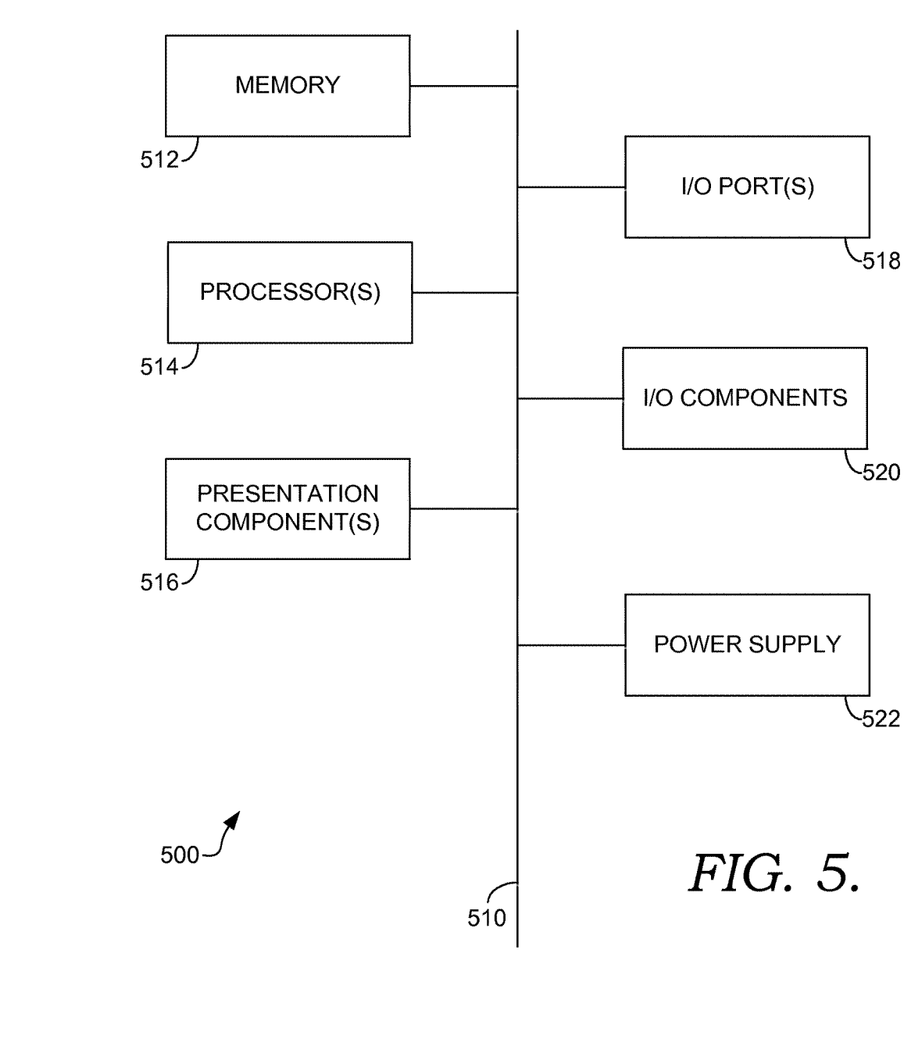
FIG. 5 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present invention are generally directed to automatically generating marketing assets from asset component based on asset features selected given a particular set of user attributes for a given user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method comprising:
collecting asset delivery event data regarding a plurality of asset delivery events that include the delivery of a plurality of marketing assets to a plurality of users, the asset delivery event data identifying, for each asset delivery event, asset features for a delivered marketing asset and user attributes of a user receiving the delivered marketing asset;
generating a model by processing the asset delivery event data using one or more machine learning techniques;
receiving a request for delivery of a new marketing asset to a user device associated with a target user;
identifying one or more user attributes of the target user;
selecting a plurality of asset features using the model and the one or more user attributes of the target user;
accessing a database of asset components in which each asset component in the database is tagged with one or more asset features characterizing content of the asset component;
selecting, from the database of asset components, a plurality of asset components corresponding to the plurality of asset features, wherein each asset component of the plurality of asset components is tagged in the database with at least one asset feature from the plurality of asset features;
generating the new marketing asset using the plurality of asset components without use of a template by using asset component relational information to locate the plurality of asset components relative to one another within the new marketing asset; and
providing the new marketing asset for presentation on a graphical user interface of the user device.

2. The method of claim 1, wherein asset delivery event data is collected only for asset delivery events that resulted in a specified user interaction with the delivered marketing asset.

3. The method of claim 1, wherein the asset delivery event data further comprises user interaction data identifying, for each asset delivery event, a user interaction with the delivered marketing asset.

4. The method of claim 1, wherein generating the new marketing asset using the plurality of asset components comprises locating a first asset component within the new marketing asset relative to a second asset component based on at least one of the plurality of asset features.

5. The method of claim 1, wherein the plurality of asset components include a first image component and a second image component, and wherein generating the marketing asset by combining the plurality of asset components comprises layering the first image component on top of the second image component to generate a composite image.

6. The method of claim 1, wherein at least a portion of the plurality of asset components is selected based on the asset component relational information specifying asset component compatibility.

7. One or more computer storage media storing computer-useable instructions that, when used by one or more computing devices, cause the one or more computing devices to perform operations comprising:
a. collecting asset delivery event data regarding a plurality of asset delivery events that include the delivery of a plurality of marketing assets to a plurality of users, the asset delivery event data identifying, for each asset delivery event, asset features for a delivered marketing asset and user attributes of a user receiving the delivered marketing asset;
b. generating a model by processing the asset delivery event data using one or more machine learning techniques;
c. receiving a request for delivery of a new marketing asset to a user device associated with a target user;
d. identifying one or more user attributes of the target user;
e. selecting a plurality of asset features using the model and the one or more user attributes of the target user;
f. accessing a database of asset components in which each asset component in the database is tagged with one or more asset features characterizing content of the asset component;
g. selecting, from the database of asset components, a plurality of asset components corresponding to the plurality of asset features, wherein each asset component of the plurality of asset components is tagged in the database with at least one asset feature from the plurality of asset features;
h. generating the new marketing asset using the plurality of asset components without use of a template by using asset component relational information to locate the plurality of asset components relative to one another within the new marketing asset; and
i. providing the new marketing asset for presentation on a graphical user interface of the user device.

8. The one or more computer storage media of claim 7, wherein asset delivery event data is collected only for asset delivery events that resulted in a specified user interaction with the delivered marketing asset.

9. The one or more computer storage media of claim 7, wherein the asset delivery event data further comprises user interaction data identifying, for each asset delivery event, a user interaction with the delivered marketing asset.

10. The one or more computer storage media of claim 7, wherein generating the new marketing asset using the plurality of asset components comprises locating a first asset component within the new marketing asset relative to a second asset component based on at least one of the plurality of asset features.

11. The one or more computer storage media of claim 7, wherein the plurality of asset components include a first image component and a second image component, and wherein generating the marketing asset by combining the plurality of asset components comprises layering the first image component on top of the second image component to generate a composite image.

12. The one or more computer storage media of claim 7, wherein at least a portion of the plurality of asset components is selected based on the asset component relational information specifying asset component compatibility.

13. A computer system comprising: one or more processors; and one or more computer storage media storing computer-usable instructions for causing the one or more processors to perform operations, the operations comprising:
a. collecting asset delivery event data regarding a plurality of asset delivery events that include the delivery of a plurality of marketing assets to a plurality of users, the asset delivery event data identifying, for each asset delivery event, asset features for a delivered marketing asset and user attributes of a user receiving the delivered marketing asset;

b. generating a model by processing the asset delivery event data using one or more machine learning techniques;

c. receiving a request for delivery of a new marketing asset to a user device associated with a target user;

d. identifying one or more user attributes of the target user;

e. selecting a plurality of asset features using the model and the one or more user attributes of the target user;

f. accessing a database of asset components in which each asset component in the database is tagged with one or more asset features characterizing content of the asset component;

g. selecting, from the database of asset components, a plurality of asset components corresponding to the plurality of asset features, wherein each asset component of the plurality of asset components is tagged in the database with at least one asset feature from the plurality of asset features;

h. generating the new marketing asset using the plurality of asset components without use of a template by using asset component relational information to locate the plurality of asset components relative to one another within the new marketing asset; and i. providing the new marketing asset for presentation on a graphical user interface of the user device.

14. The computer system of claim 13, wherein asset delivery event data is collected only for asset delivery events that resulted in a specified user interaction with the delivered marketing asset.

15. The computer system of claim 13, wherein the asset delivery event data further comprises user interaction data identifying, for each asset delivery event, a user interaction with the delivered marketing asset.

16. The computer system of claim 13, wherein generating the new marketing asset using the plurality of asset components comprises locating a first asset component within the new marketing asset relative to a second asset component based on at least one of the plurality of asset features.

17. The computer system of claim 13, wherein the plurality of asset components include a first image component and a second image component, and wherein generating the marketing asset by combining the plurality of asset components comprises layering the first image component on top of the second image component to generate a composite image.

18. The computer system of claim 13, wherein at least a portion of the plurality of asset components is selected based on the asset component relational information specifying asset component compatibility.

* * * * *